United States Patent [19]

Day

[11] Patent Number: 5,203,521
[45] Date of Patent: Apr. 20, 1993

[54] ANNULAR BODY AIRCRAFT

[76] Inventor: Terence R. Day, 9 Wolfram Court, Anula, Northern Territory, Australia, 0812

[21] Appl. No.: 773,568

[22] PCT Filed: May 11, 1990

[86] PCT No.: PCT/AU90/00193
§ 371 Date: Nov. 8, 1991
§ 102(e) Date: Nov. 8, 1991

[87] PCT Pub. No.: WO90/13478
PCT Pub. Date: Nov. 15, 1990

[30] Foreign Application Priority Data

May 12, 1989 [AU] Australia ............... PJ4143
Jun. 16, 1989 [AU] Australia ............... PJ4760

[51] Int. Cl.⁵ .......................................... B64C 15/00
[52] U.S. Cl. ................... 244/12.2; 244/23 C; 244/73 B
[58] Field of Search ........... 244/23 C, 2.2, 52, 208, 244/73 R, 73 B, 73 C

[56] References Cited

U.S. PATENT DOCUMENTS

| 2,927,746 | 3/1960 | Mellen | 244/12 |
| 3,073,551 | 1/1963 | Bowersox | 244/73 B |
| 3,397,853 | 8/1968 | Richardson | 244/23 |
| 3,489,374 | 1/1990 | Morcom | 244/12.2 |
| 4,273,302 | 6/1981 | Jordan | 244/73 R X |
| 4,566,699 | 1/1986 | Cucuzza | 244/12.2 |
| 4,674,708 | 6/1987 | del Castillo | 244/12.2 |
| 4,778,128 | 10/1988 | Wright et al. | 244/52 X |
| 4,941,628 | 7/1990 | Sakamoto et al. | 244/23 C X |

FOREIGN PATENT DOCUMENTS

| 0588302 | 12/1959 | Canada | 244/23 C |
| 1423766 | 11/1965 | France | |
| 0339462 | 4/1956 | Italy | 244/12.2 |

Primary Examiner—Joseph F. Peters, Jr.
Assistant Examiner—Christopher P. Ellis
Attorney, Agent, or Firm—Nixon & Vanderhye

[57] ABSTRACT

An aircraft having an annular body, defining a central passageway; an upper deflector, a lower collector and a fluid drive in the passageway. Air is accelerated by the fluid drive and circulates around the annular body. The collector divides the circulating air and directs a portion into passageway and a portion to beneath the aircraft to provide a further thrust.

14 Claims, 2 Drawing Sheets

ANNULAR BODY AIRCRAFT

TECHNICAL FIELD

This invention relates to an aircraft having vertical lift capabilities and includes those which can hover above a ground surface. The aircraft includes an annular body.

BACKGROUND ART

Vertical lift aircraft having an annular air foil construction can be classified into two broad areas. The first area includes those which draw air from a position above the aircraft and direct the air over an upper surface of the annular airfoil. Examples of such aircraft are found in U.S. Pat. Nos. 2,927,746, 2,978,206, 3,073,551, 4,214,720 and 4,566,699.

The second type of aircraft includes those which draw air in from a position beneath the aircraft, accelerates the air by means of a propulsion system and directs the accelerated air over the upper surfaces of the airfoil. Examples of such aircraft are found in U.S. Pat. Nos. 4,674,798 and 3,397,853.

U.S. Pat. No. 4,674,708 teaches an aircraft having an annular airfoil with planar upper and lower surfaces. Air is drawn in through a base opening and is accelerated by a turbo jet engine located in a central passageway and is directed over the upper surface of the annular air foil. Due to the configuration of the air foil, air does not circulate around the upper and lower surfaces of the airfoil but instead is flung off the peripheral edge of the airfoil. This patent does not teach an airfoil configuration which allows air to circulate around the airfoil and which directs a portion of air circulating around the airfoil to below the aircraft to provide additional thrust.

U.S. Pat. No. 3,397,853 discloses an aircraft having an annular body and a central passageway. A propulsion unit is located within the central passageway. A deflector is located above the passageway to deflect accelerated air over the annular body. A cup or dish shaped member is located below the central passageway and extends sufficiently past the widest portion of the annular body to capture all the air flowing over the annular body.

The configuration of the dish shaped member does not allow a portion of the circulated air to be split off from the main stream to be diverted to beneath the aircraft to provide additional thrust. There is no teaching in this patent that the dish shaped member can be used to split circulating air flow.

DISCLOSURE OF THE INVENTION

It is an object of the invention to provide an aircraft which may be least partially overcome the abovementioned disadvantages.

In one form the invention resides in an aircraft comprising an annular body having a passageway, an outermost periphery, an airfoil surface and a surface configuration to facilitate circulation of fluid around said body, a fluid drive to accelerate fluid through said passageway, a deflector disposed above said passageway to direct accelerated fluid from said passageway to outwardly across the surface of said annular body, and a collector disposed below said passageway, said collector having a peripheral edge terminating short of said outermost periphery of said annular body, for directing a portion of fluid circulating around said annular body to said fluid drive and directing a portion of fluid circulating around said annular body to below said aircraft.

The annular body may have a cross-sectional configuration approximating that of a flattened torus. The generally flattened toroidal configuration facilitates fluid flow about the surface of the annular body and through the passageway. The torus may comprise thickened portions. The thickened portions may be disposed adjacent the inner or outer periphery of the body to enhance fluid flow around the annular body.

The annular body may be configured such that a portion of the surface of the body comprises the lowermost portion of the aircraft.

Preferably, the annular body has an upper surface which is of a generally airfoil configuration.

The annular body may be solid or may comprise one or more interior spaces or compartments. The spaces may be suitable for storage of goods, accommodation of passengers and may include a pilots cabin.

The fluid drive is preferably located within the passageway to accelerate fluid through the passageway from a lower position to an upper position. The fluid drive may comprise a propellor. The propellor may extend across the closely spaced from the wall of the passageway. The propellor may be driven by a motor. The motor may be located in the lower portion of the passageway. The motor may be supported by the collector.

Alternately, the fluid drive may comprise a jet engine, gas turbine or other type of propulsion unit.

The deflector may be rigidly mounted relative to said annular body or may be movable relative to said annular body.

The deflector may be tiltable or fixed relative to the annular body. The deflector may be spaced from the annular body by a plurality of spacers. The spacers may be annularly spaced about the annular body.

The spacing between the deflector and the annular body may be varied with smaller spacings resulting is increased volocities of fluid exiting from the deflector.

The deflector may be secured to the annular body and/or the collector by struts or fasteners. The fasteners may comprise elongate threaded bolts which may extend through the interior of the spacers.

The defender may be substantially disk-like in configuration. The deflector may have an inner surface adjacent the passageway, the inner surface being configured to deflect accelerated fluid exiting from said passageway outwardly across the upper surface of the annular body. The inner surface may include a central portion located substantially above the passageway and partially depending into the passageway and a curved surface extending from the depending portion of the periphery of the deflector. The central depending portion may comprise a hollow shaft to facilitate access to the fluid drive.

The aircraft may include a plurality of deflectors to deflect air from the passageway to the surface of the annular body. The further deflectors may be disposed adjacent the deflector or adjacent the annular body.

The collector may extend across the lower portion of the passageway and may be spaced from the lower surface of the annular body.

The collector may be rigidly mounted or tiltable relative to the annular body. The collector may be spaced from the annular body in a fixed or movable fashion. Struts may be provided to space the collector from the annular body. The struts may be spaced about the annular body.

The collector may comprise a substantially plate-like member. The plate-like member may be concave or convex relative to the passageway.

Preferably, the collector is substantially circular in configuration and has a diameter less than the diameter of the annular body such that the peripheral edge of the collector terminates short of the outermost periphery of the annular body.

The collector functions to direct a portion of the fluid circulating around the annular body towards the passageway and to direct a portion of the fluid circulating around the body to below the aircraft. The distance between the peripheral edge of the collector and the outermost periphery of the annular body can vary depending on the velocity of the fluid flow circulating around the annular body, with smaller sized collectors being suitable for higher velocity fluid flows. The spacing between the collector and the annular body can be varied depending on the volume of fluid passing into the passageway, with a larger spacing being suitable for larger volumes of circulating fluid.

The collector may include one or more slots. The one or more slots may define an annular slot. The annular slot may be positioned adjacent the peripheral edge of the collector and may function to further divert fluid to the passageway.

The collector may comprise a plurality of spaced plate-like members. The members may be of progressive smaller sizes to define a number of inlets.

The aircraft may include one or more spoilers. The spoilers may be located substantially within the annular body or adjacent the deflector or collector and may be movable to a position where they spoil the fluid flowing around the annular body. The spoilers may comprise a plate-like member which is extendible into the fluid flow. The aircraft may and preferably comprises four equally spaced spoilers.

The aircraft may include means to prevent counter spin. The means may include one or more spoilers interrupting the fluid flow around the annular body and positioning to providing a counter-thrust to the annular body to cancel the counter spin effect.

The spoilers may be located on or adjacent the deflector and/or on or adjacent the collector.

The aircraft may include suitable circuitry and componentry to allow it to be remote controlled. The componentry may be coupled to the spoilers and/or drive means to allow a remote operator to operate the aircraft.

The aircraft may be associated with landing gear or support legs to support the aircraft above the ground surface. The landing gear or support legs may be rigidly mounted or retractable within the body of the aircraft.

DESCRIPTION OF THE DRAWINGS

The invention will be more fully described with reference to the following description of one embodiment in which.

DETAILED DESCRIPTION

Figure 1:
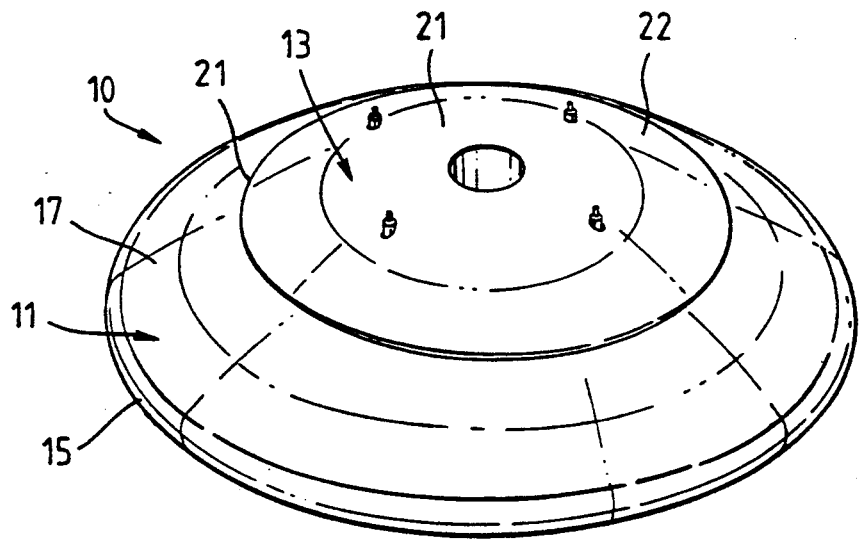
FIG. 1 is a top perspective view of an aircraft according to the invention.

The drawings are directed to an aircraft 10 having an annular body 11 which defines a central passageway 12. A deflector 13 is positioned above the passageway 12 and a collector 14 is positioned below passageway 12.

Annular body 11 has an outermost periphery 15, an innermost periphery 16, an upper surfaces 17 and a lower surface 18.

Upper surface 17 has an airfoil configuration while lower surfaces 18 is substantially planar between outer and inner peripheries 15 and 16.

Annular body 11 has a cross-sectional configuration having a portion of maximum thickness (X) adjacent innermost periphery 16 and which decreases towards outermost periphery 15.

The ratio of the portion of maximum thickness (X) to the length of the annular body defined between the outmost portion 15 is about 0.12.

The ratio of the maximum width (Y) of annular body 11 to the length of the annular body defined between outermost periphery 15 is about 0.315.

The ratio between portion (X) and portion (Y) is about 0.378.

Figure 4:
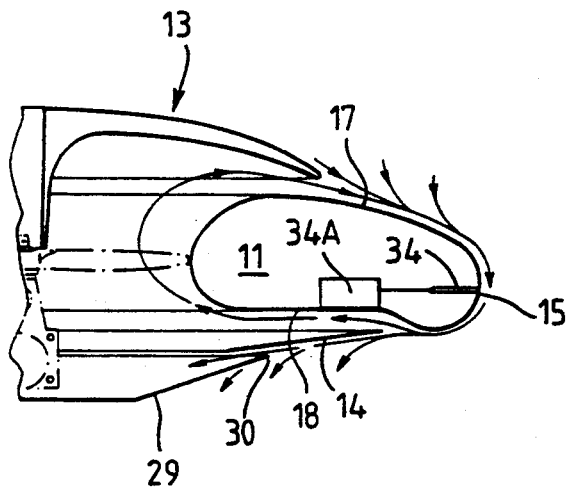
FIG. 4 is a partial side section view of an alternative body configuration.

FIG. 4 describes a further configuration of annular body portion 11. In this embodiment, the configuration of the annular body adjacent the outermost periphery 15 is enlarged to provide a gentler radius of curvature between upper and lower surfaces 17 and 18 to faciliate fluid flow around this portion.

Passageway 12 is substantially circular when viewed in plan and is partially defined by the wall of annular body 11 above and below innermost periphery 16.

The ratio of the minimum diameter (Z) of passageway 12 to the diameter of the length of the annular body between outermost periphery 15 is about 0.35.

Passageway 12 includes upper and lower openings of wider diameter relative to the diameter of (Z), the walls of which are partially defined by the outwardly extending surfaces on annular body 11.

Deflector 13 is positioned above the upper opening of passageway 12. Deflector 13 is substantially circular in configuration when viewed in plan. The deflector has an outer surface 19 and an inner surface 20 which are joined along an outer periphery 21.

The ratio of the size of the deflector 13 defined between outermost periphery 21 and the length of the annular body defined between outer periphery 15 is about 0.63.

Outer surface 19 includes a central substantially planar portion 21 and an outer curved portion 22 which extends towards annular body 11.

Inner surface 20 includes a central portion 23 depending partially into the upper opening or outlet of passageway 12 and a substantially continuously curved surface extending from portion 23 outermost periphery 21.

The configuration of inner surface 23 results in fluid extending from passageway 12 being deflected to pass over upper surface 17 of annular body 11.

Central portion 12 in the embodiment comprises a hollow shaft extending between adjacent the fluid drive and outer surface 19 at a position approximately central to the outer surface. The hollow shaft allows access to the fluid drive if necessary. It should be appreciated that the hollow shaft is not essential and the central portion may also be substantially solid if access to the fluid drive is not required.

Deflector 13 is spaced from annular body 11 such that a fluid pathway is established between passageway 12 and upper surface 17 or body 11.

Outermost periphery 21 of the deflector is spaced above upper surface 17 of annular body 11 much that the ratio between this spacing and the minimum inner diameter of passageway 12 (shown as 2) is about 0.066.

Figure 2:
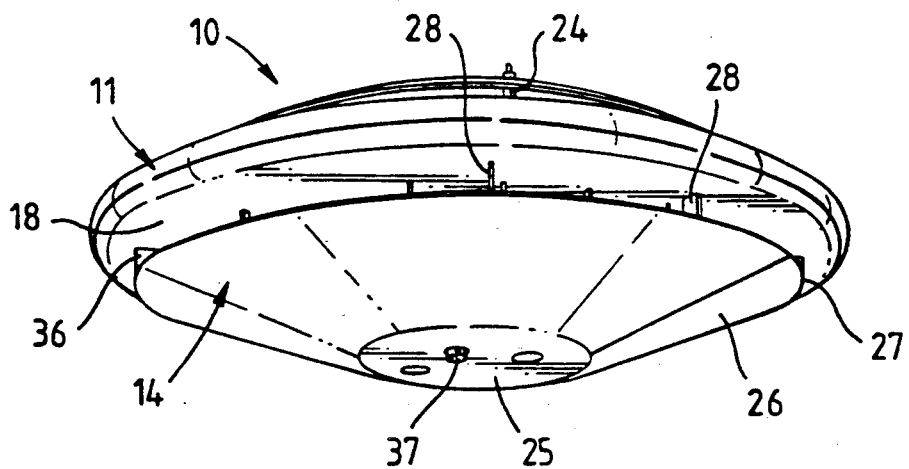
FIG. 2 is a bottom perspective view of an aircraft according to the invention.
Figure 3:
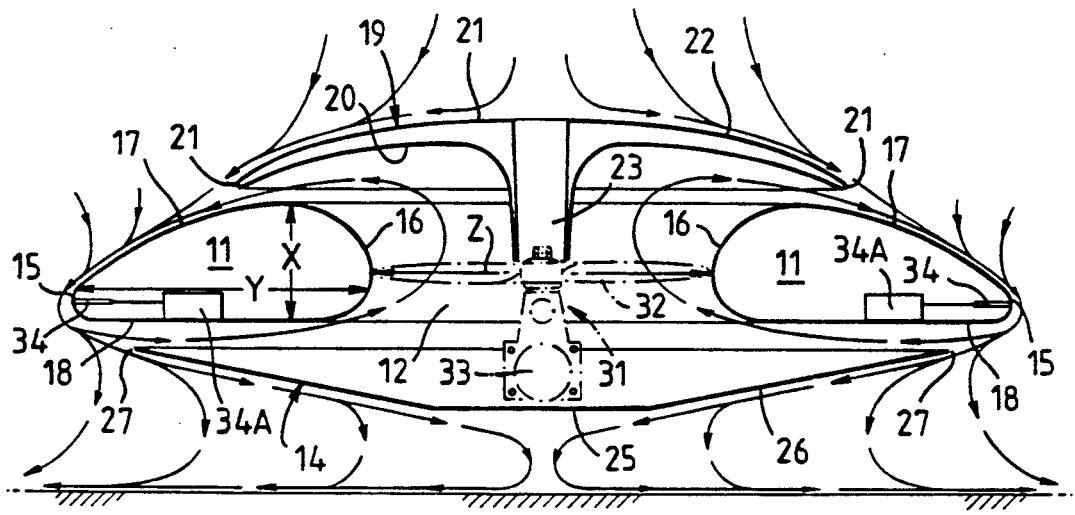
FIG. 3 is a side section view of FIG. 1.

The deflector is secured to the annular body by a plurality of spacers or struts 24 (see FIG. 2) which extend about the periphery of the annular body. Some or all of struts 24 can function as counter spin spoilers which are described in more detail below.

Collector 14 is positioned below passageway 12 and below the lower opening of the passageway.

Collector 14 has a substantially circular configuration when viewed in plan and includes a central substantially planar portion 25 and an outer inclined portion 26 which is inclined towards the lower surface 18 of annular body 11.

Outer periphery 27 of collector 14 terminates short of the outer periphery 15 of annular body 11 and is located spaced from lower surface 18. The ratio between the length of the collector defined between outer periphery 27 and the length of the annular body defined between the periphery 15 is about 0.846.

Collector 14 is spaced from annular body 11 to establish a fluid pathway between lower surface 18 and passageway 12. The ratio of this spacing and the minimum internal diameter of passageway 12 (shown as Z) is about 0.08.

Collector 14 is secured to annular body 11 by spacers or struts 28. One or all of spacers or struts 28 may also function as a counter spin spoiler as described in more detail below.

FIG. 4 shows a further arrangement of the collector. In this arrangement, a further collector 29 is positioned below collector 14 to define a further fluid inlet to direct fluid into passageway 12.

A further collector 29 is substantially circular when viewed in plan and has a maximum length which is less than the maximum length of collector 14. In this manner, the outermost peripheral edge 30 of further collector 29 is spaced inwardly from peripheral edge 27 of collector 14.

The ratio of the length of collector 29 to collector 14 is about 0.7.

The ratio of the spacing between peripheral edge 30 and collector 14 and lower surface 18 is about 0.33.

A fluid drive 31 is located within annular body 11 and substantially within passageway 12. In the embodiment, fluid drive comprises a propellor 32 driven by motor 33.

Propellor 32 is located within the passageway and adjacent the minimum internal diameter of passageway. Propellor 32 has a diameter slightly smaller than the minimum internal diameter of passageway 12 such that substantially all the fluid passing through passageway 12 is contacted by and accelerated by the propellor.

Motor 33 is supported by the central portion 25 of collector 14.

The ratio of the maximum distance between the outer surface 19 of deflector 13 and collector 14 to the length of annular body 11 defined between outermost periphery 15 is about 0.30.

The motion of the aircraft 10 is controlled by spoilers 34. Spoilers 34 in the embodiment are located within annular body 11 when in a retracted position and can extend therefrom to spoil the flow of fluid around body 11. Spoilers 34 are controlled by a suitable motor such as a servo motor 34a which is also located within annular body 11. Spoilers 34 include a plate like member which extends into the fluid flow. The spoilers are positioned about the annular body and advantageously four such spoilers are located equally spaced about body 11 to allow forward, rearward and sideward motion of the aircraft.

To prevent counterspin of the aircraft due to rotation of propellor 32 and engine torque in passageway 12, a number of angled spoilers 36 are positioned within the fluid flow around annular body 11. Angled spoilers 36 may include some or all of the spacers or struts 28 which position deflector 13 or collector 14 from annular body 11. The angled spoilers comprise a longitudinal axis which intersects the fluid flow at an angle to provide the aircraft with the necessary amount of counterspin to cancel the effect of the motion of the propellor. It should be realized however that other propulsion units may not require counterspin spoilers however it may still be desirable to include one or more spoilers to provide a rudder and/or to control yaw of the aircraft.

In use, fluid drive 31 accelerates air within passageway 12. The accelerated air is deflected by deflector 13 which diverts the air across the upper surface 17 of body 11. The accelerated laminar air circulates about annular body 11 and is divided by the peripheral edge 27 of collector 14 such that part of the accelerated air flows into the lower portion of passageway 12 and part of the accelerated air flows beneath collector 14 to provide additional thrust to the aircraft. An exhaust vent 37 is located below the aircraft to exhaust combustion gases from motor 33.

The deflector facilitates feeding the accelerated fluid smoothly onto the upper surface 17 of annular body 11 to result in even distribution of fluid about the body.

Once the accelerated fluid is travelling over surface 17, the fluid will adhere to the surface according to well known principles. Furthermore, the accelerated fluid will give some attraction or lift to upper surface 17 due to its airfoil configuration. The accelerating fluid does not separate from the upper surface of the annular body because of its laminar nature resulting from its velocity.

In the embodiment, the deflector is of a smaller size than the annular body and thus fluid being accelerated from the deflector across surface 17 passes over a surface having a progressively increased surface area. This results in the fluid molecules exiting from the deflector causing adjacent "ambient" air to be drawn into the accelerated fluid. The combined fluids circulate about annular body 11 from upper surface 17 to lower surface 18.

Collector 14 divides the circulating fluid flow such that the fluid flowing into passageway 12 is equal to the fluid being accelerated out of passageway 12 with the remainder of the accelerated fluid passing below collector 14 to provide further thrust to the aircraft.

The remaining portion of the accelerated fluid can form a fluid cushion beneath the aircraft to provide the aircraft with "hovercraft" capabilities, the complement the lift provided by fluid flow over the annular body.

The aircraft can be controlled by the use of spoilers as described above or alternatively, deflector 13 can be mounted for tilting movement to create more lift along one area of surface 17 relative to another area to result in tilting of the whole aircraft. Such a tiltable deflector is described in U.S. Pat. No. 3,397,853. The collector may also be mounted for tilting movement relative to the annular body to provide a similar effect.

The collector may include a concave cross-sectional configuration relative to a ground surface. This particular configuration provides better hovering characteristics to the aircraft as it traps more fluid beneath the aircraft.

A further advantage of the aircraft according to the invention is that the fluid to be accelerated through passageway 12 is substantially drawn from the fluid circulating around annular body 11 and does not include additional fluid. A consequence of this is that when hovering above a ground surface, the aircraft will not suck in ground debris or water (if hovering above water). The fluid passing beneath collector 14 provides sufficient positive pressure to prevent such contamination of passageway 12 by debris or water.

It should also be appreciated that when a gas turbine or jet engine is sused as a fluid drive, the fluid will also comprise exhaust gases of the turbine or engine. This will result in improved performance of the aircraft as a greater volume of fluid is being accelerated and passed around annular body and a greater volume of fluid is being passed below collector 14.

It should be appreciated that various other changes and modifications may be made to the embodiment described without departing from the spirit and scope of the invention as defined in the appended claims.

I claim:

1. An annular recirculating fluid apparatus comprising:
    an annular body having a passageway, the body having an upper stationary, non-adjustable airfoil surface and being further configured to facilitate circulation of fluid around said body and through the passageway,
    a fluid drive to accelerate fluid through said passageway,
    a deflector disposed above said passageway and at least partially overlying said upper airfoil surface to direct accelerated fluid from said passageway outwardly across said upper airfoil surface of said annular body, and
    a collector disposed below said passageway, said collector having a peripheral edge terminating short of the outermost periphery of said annular body, for directing a portion of fluid circulating around and under said annular body to said fluid drive, and directing another portion of fluid circulating around and under said annular body downwardly away from said annular body.

2. The apparatus as claimed in claim 1, wherein said annular body comprises a substantially flattened toroidal configuration.

3. The apparatus as claimed in claim 1, wherein said fluid drive is located within said passageway.

4. The apparatus as claimed in claim 1, wherein said fluid drive comprises a propeller extending transversely across said passageway, the outer edge of said propellor being closely spaced from the wall of the passageway, said propellor being driven by a motor.

5. The apparatus as claimed in claim 1, wherein said deflector is disk-like in configuration and comprises an inner surface configured to deflect accelerated fluid exiting from said passageway outwardly across the upper surface of said annular body.

6. The apparatus as claimed in claim 5, wherein said inner surface comprises a central portion located above said passageway and partially extending into said passageway and a curved surface extending from said central portion to the periphery of the deflector.

7. The apparatus as claimed in claim 1, wherein said collector is disk-like in configuration.

8. The apparatus as claimed in claim 7, wherein said collector is formed with a central planar portion and a surrounding inclined portion inclined towards said annular body.

9. The apparatus as claimed in claim 1 comprising a further collector disposed below said collector to divert a portion of the fluid passing below said aircraft to said passageway.

10. The apparatus as claimed in claim 1 including at least one spoiler for maneuvering the aircraft.

11. The apparatus as claimed in claim 10, wherein said spoiler comprises a plate like member movable to a position wherein said member spoils the fluid circulating around said annular body.

12. The apparatus as claimed in claim 11, comprising a plurality of spoilers spaced about the periphery of said annular body.

13. The apparatus as claimed in claim 1, including means to prevent counter spin of said aircraft.

14. The apparatus as claimed in claim 13, wherein said means includes at least one spoiler which intersects the fluid circulating about said annular body at an angle sufficient to provide a thrust to the aircraft to counter the counterspin.

* * * * *